(No Model.) 3 Sheets—Sheet 1.
T. F. HART & G. S. HILL.
SEWING MACHINE.
No. 406,277. Patented July 2, 1889.
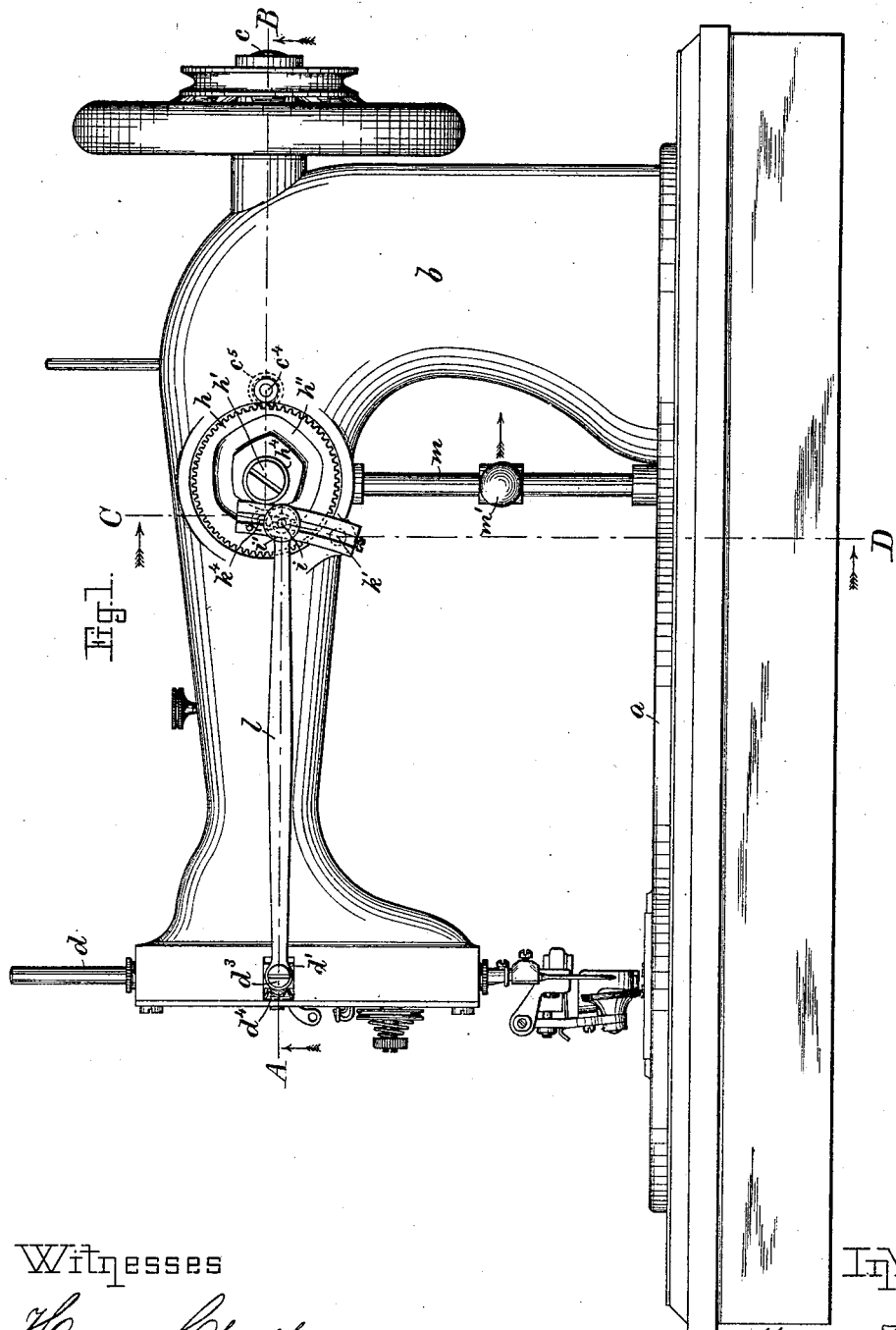
Witnesses
Henry Chadbourn.
Herbert L. Chapin.
Inventors
Thomas F. Hart
and George S. Hill
by Alban Andrew their atty (No Model.) 3 Sheets—Sheet 2.
T. F. HART & G. S. HILL.
SEWING MACHINE.
No. 406,277. Patented July 2, 1889.
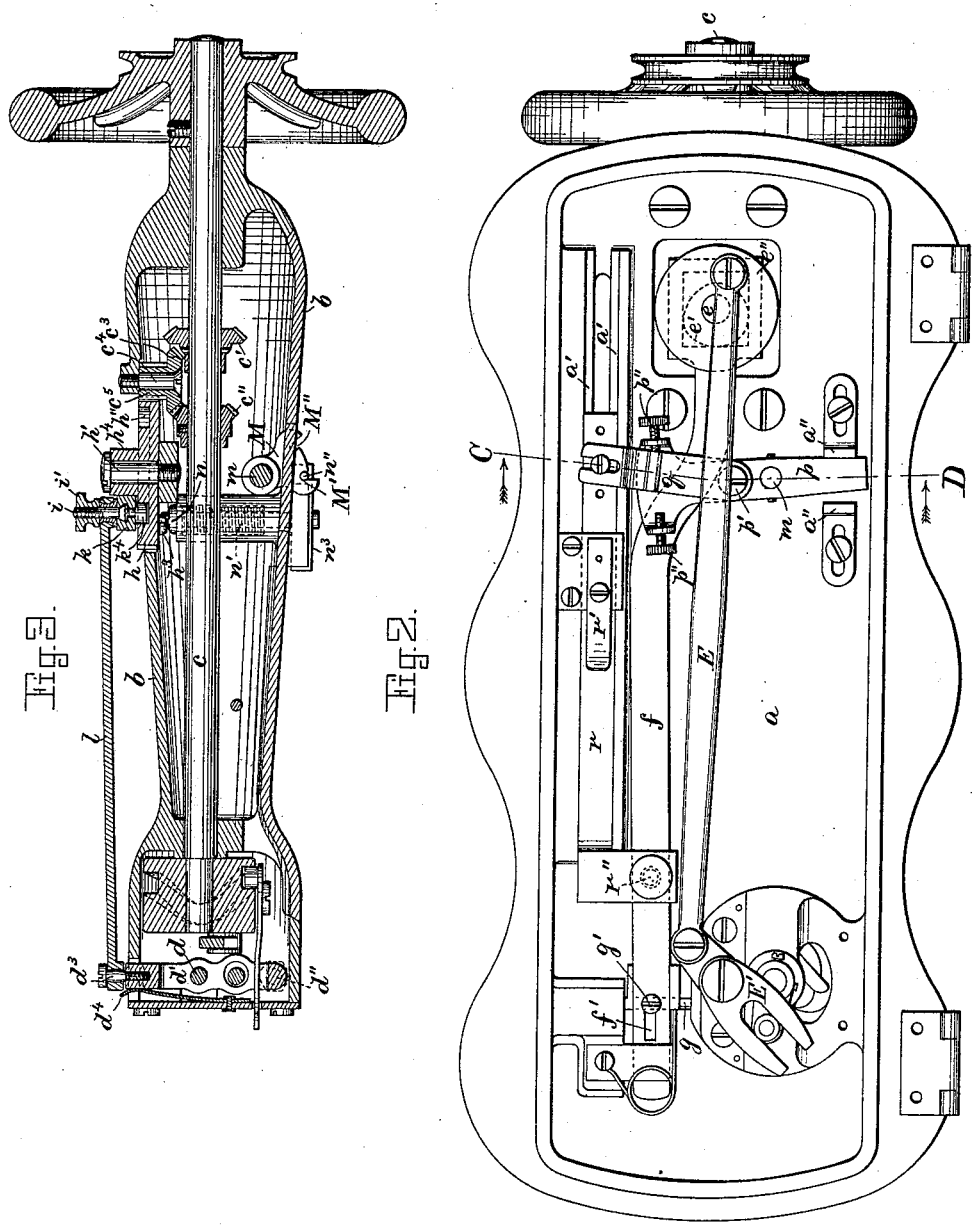
Witnesses
Henry Chadbourn
Herbert L. Chapin
Inventors
Thomas F. Hart
and George S. Hill.
by Alban Andrew, their atty

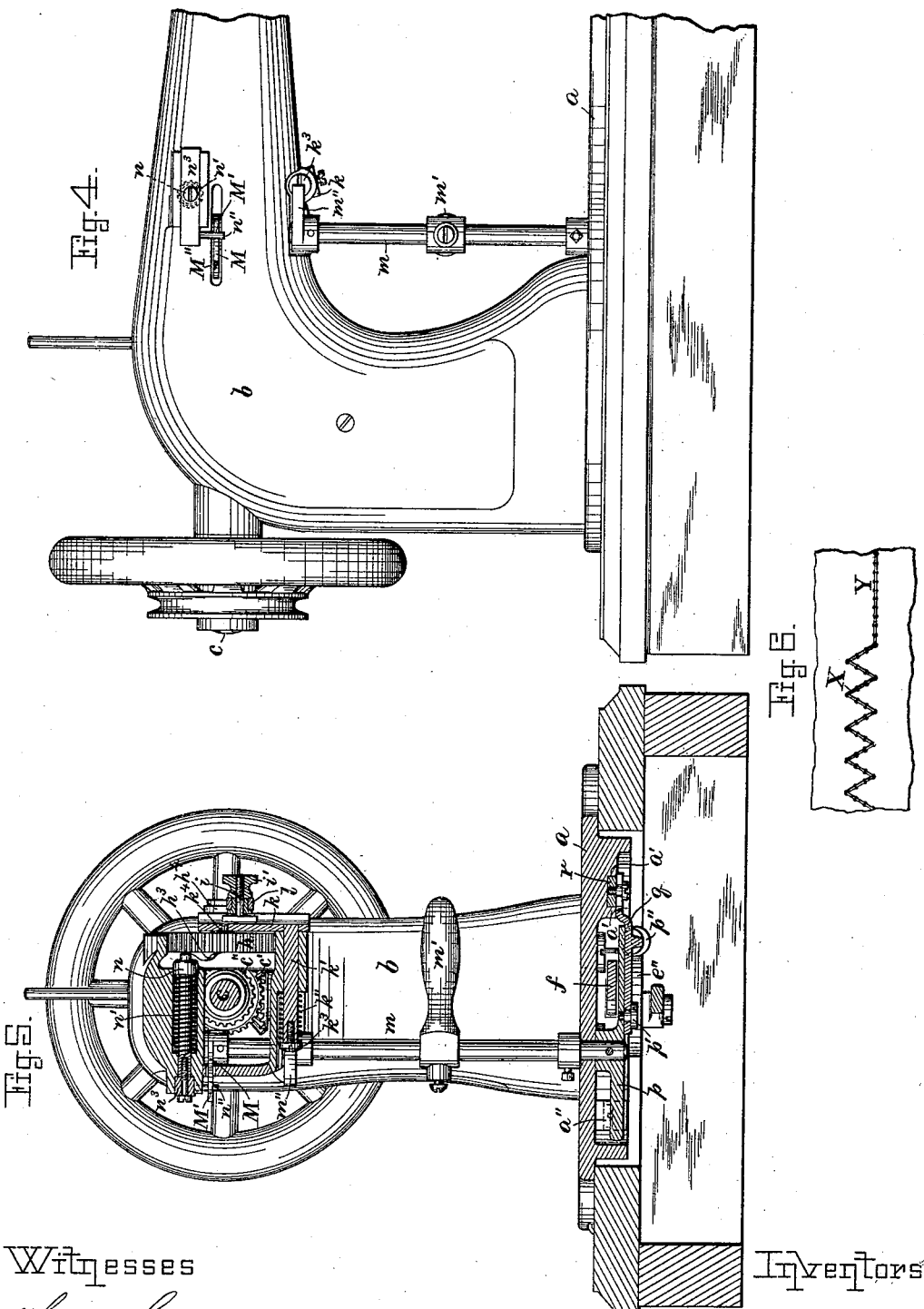

UNITED STATES PATENT OFFICE.

THOMAS F. HART AND GEORGE S. HILL, OF LYNN, MASSACHUSETTS; SAID HILL ASSIGNOR TO SAID HART.

SEWING-MACHINE.

SPECIFICATION forming part of Letters Patent No. 406,277, dated July 2, 1889.

Application filed May 29, 1888. Serial No. 275,475. (No model.)

*To all whom it may concern:*

Be it known that we, THOMAS F. HART and GEORGE S. HILL, both citizens of the United States, and residents of Lynn, in the county of Essex and State of Massachusetts, have jointly invented new and useful Improvements in Sewing-Machines, of which the following, taken in connection with the accompanying drawings, is a specification.

This invention relates to that type of sewing-machines wherein the needle-bar reciprocates in a frame vibrated by a cam geared to the main driving-shaft to form zigzag stitches.

The object of our invention is to provide novel means for operating the vibrating frame, stopping and starting its vibrations at will, and making a straight line of stitches, or a zigzagged line of stitches, or alternating straight and zigzagged lines of stitches, as may be desired.

The object of our invention we accomplish by the combination of devices hereinafter described and claimed, reference being made to the accompanying drawings, in which—

Figure 1 represents a front elevation of our improved sewing-machine. Fig. 2 represents a bottom view of the same. Fig. 3 represents a section on the line A B, shown in Fig. 1. Fig. 4 represents a partial rear view of the machine. Fig. 5 represents a cross-section on the line C D, shown in Figs. 1 and 2; and Fig. 6 represents a plan view of a straight and a zigzagged line of stitches, for making which the machine is adapted.

Similar letters refer to similar parts wherever they occur on the different parts of the drawings.

$a$ is the work-supporting plate; $b$, the goose-neck; $c$, the rotary driving-shaft for actuating the needle-bar $d$, as is usual in Singer or other sewing-machines. To the shaft $c$ is secured, as usual, the bevel-pinion $c'$, by means of which and mechanism common to sewing-machines of this kind a rotary motion is imparted to the shaft $e$, such mechanism being, however, not shown in the drawings, as it does not form a part of our invention. The shaft $e$ has secured to it the cam $e'$, (shown in dotted lines in Fig. 2,) as usual, for imparting a rocking motion to the feed-lever $f$, to the forward end of which is pivoted the feed-dog $g$. To the shaft $e$ is also secured the crank-disk $e''$, to which is hinged the rod E, that is pivoted in its forward end to the rock-lever E', for imparting an oscillating motion to the hook or shuttle below the work-supporting plate, in the usual manner.

In connection with the above we use mechanism for making a zigzag line of stitches, as represented at $x$ in Fig. 6, with any desired number of stitches between the ends of the zigzag rows, and this mechanism is constructed as follows:

The needle-bar $d$ is journaled in a rocking frame $d'$, that is pivoted at $d''$ to the forward end of the goose-neck of the machine, as shown in Fig. 3. A reciprocating motion crosswise to the line of feed is imparted to the needle-bar from the rotary driving-shaft $c$ as follows: To said shaft is secured the bevel gear-pinion $c''$, the teeth of which mesh in the teeth of the bevel gear-pinion $c^3$, loosely journaled on the pin or stud $c^4$, secured to the goose-neck frame, and to said gear $c^3$ is secured or made in one piece the spur gear-pinion $c^5$, the teeth of which mesh in the teeth of the spur-gear $h$, loosely journaled on a pin or stud $h'$, secured to the goose-neck frame, as shown in Figs. 1, 3, and 5. The gear $h$ has on its outer side a polygonal graduated cam-groove $h''$, adapted to receive a pin or pin and roll $k^4$, attached to the arm $k$, the latter being grooved or slotted for the reception of the inner end of the pin $i$, that is capable of adjustment in the slotted arm $k$ to and from the fulcrum-pin $k'$ of said arm, and after being so adjusted the said pin $i$ is secured to the slotted arm $k$ by means of the thumb-nut $i'$, that is secured to the outer end of said pin $i$, as shown in Figs. 1, 3, and 5.

To the pin $i$ is hinged the rear end of the link $l$, the opposite end of which is hinged to the screw or pin $d^3$, that is secured to the free end of the needle-bar frame $d'$, as shown in Figs. 1 and 3. By this arrangement it will be seen that a comparatively slow intermittent reciprocating motion is imparted to the needle crosswise to the line of feed while the needle is above the work, so as to produce the zigzag line of stitches shown at $x$ in Fig. 6. By adjusting the position of the pin $i$ relative to the slotted rocking arm $k$ the amount of such reciprocating movement of the needle can be regulated. The arm $k$ is secured to the fulcrum-pin $k'$, that is journaled in a bearing in the goose-neck frame, and it is normally held in such a position relative to the grooved cam-wheel $h$ that the pin or pin and roll $k^4$ shall rest in the cam-groove of the said wheel $h$, as shown in Figs. 3 and 5, as long as it is desired by the operator to make the zigzag line of stitches. The slotted arm $k$ is so held by the influence of the spring $k''$, that surrounds the fulcrum-pin $k'$ and has its inner end resting against the bearing for said fulcrum-pin, its outer end pressing against a screw or collar $k^3$, secured to the free end of the said fulcrum-pin $k'$, as shown in Fig. 5. Whenever it is desired by the operator to change from a zigzag $x$ to a straight line of stitches Y in Fig. 6, it is only necessary to push on the fulcrum-pin $k'$ sufficient to disengage the pin or pin and roll $k^4$ from the cam-groove $h''$, when of course no reciprocating motion is imparted to the needle-frame and its needle-bar crosswise to the line of feed. Such disengagement of the pin $k^4$ is accomplished by means of the vertical shaft $m$, having a handle $m'$ secured to it for the operator to take hold of; or, instead of such a handle, suitable mechanism may be employed, so that the operator may actuate said shaft $m$ for this purpose by means of knee or foot pressure without departing from the spirit of our invention. The same effect may be produced by moving the pin $i$ on the slotted arm $k$ to a position coinciding with that of the fulcrum-pin $k'$. To said shaft $m$ is also secured a dog or lever $m''$, that comes in contact with the free end of the fulcrum-pin $k'$ when the handle $m'$ is swung in the direction shown by arrow in Fig. 1. Thus it will be seen that by turning the handle $m'$ in said direction the lever $m''$ is caused to press against the fulcrum-pin $k'$, and thus force the arm $k$ and pin $k^4$ against the influence of the spring $k''$ sufficiently to disengage the pin $k^4$ from the cam-groove in the wheel $h$, for the purpose above mentioned; but it is desirable that such disengagement should only be possible at regular stated intervals, so as to produce an even and symmetrical zigzag line of stitches, as shown at $x$ in Fig. 6, and for this purpose we use in connection with the rock-shaft $m$ an automatic locking device constructed as follows:

In bearings in the goose-neck frame is located a pin $n$, that is normally held in contact with the inside of the gear $h$ by the influence of a suitable spring $n'$. (Shown in Fig. 5.) To the rear end of said spring-pressed pin $n$ is secured a locking-pin $n''$, preferably by means of a block or cross-piece $n^3$, located in guides at the rear of the goose-neck, as shown in Figs. 4 and 5.

To the upper end of the rock-shaft $m$ is secured a lever M, having notches M' M'', as shown in Fig. 3, adapted to receive the locking-pin $n''$, thus preventing the turning of the shaft $m$ as long as the pin $n''$ rests in either of the said two notches M' M''.

To the rear of the gear-wheel $h$ is secured a cam-shaped projection $h^3$, which comes in contact with and presses outward the spring-pressed pin $n$ once during each revolution of said wheel $h$, and when it does so it releases the pin $n''$ from the notched lever M, thus permitting the operator to turn the handle $m'$, so as to disengage the pin $k^4$ from the cam-groove in the wheel $h$, and to hold it in such disengaged position by the locking-pin $n''$ dropping in one of the notches M' M'' by the influence of the spring $n'$ and pin $n$ as soon as the projection $h^3$ on the gear $h$ passes by said pin $n$. When the pin $k^4$ is kept disengaged from the grooved wheel $h$, the arm $k$ is pressed against the cylindrical hub $h^4$ by the influence of the spring $d^4$ pressing against the outside of the needle-bar frame $d'$, as shown in Fig. 3, thus holding said needle-bar frame stationary. Whenever a return from a straight to a zigzag line of stitches is desired, it is accomplished by swinging the handle $m'$ in the opposite direction as soon as its lever M is disengaged from the locking-pin $n''$, as above described.

In making a line of stitches as shown in Fig. 6—that is, partly zigzag and straight—it is desirable to change the feed of the material in such a manner as to feed quicker while making the straight line of stitches as compared with the making of the zigzag one, and for this purpose we use, in connection with the throw-off shaft $m$, a connecting mechanism to the rock feed-lever $f$, for varying the feed relative to straight and zigzag work, constructed as follows:

Below the work-plate $a$ is secured to the shaft $m$ a lever $p$, to which is pivoted at $p'$ the secondary lever $q$, which, as the lever $p$ is rocked, is actuated by adjustable set-screws $p''$ $p''$, screwed through ears on said lever $p$, as shown in Fig. 2, thus causing the lever $q$ partially to partake of the motion of the shaft $m$ and its lever $p$. The lever $q$ is suitably connected to a slide-bar $r$, as shown in Fig. 2, adapted to slide in guides $a'$ $a'$ on the under side of the work-plate $a$, as shown. A friction-spring $r'$ serves to retain the bar $r$ in position after being adjusted by the movement of the shaft $m$ and its lever $p$. The forward end of the bar $r$ is pivoted at $r''$ to the rock feed-lever $f$, as shown in Fig. 2, thus causing the fulcrum of said feed-lever to be moved to and from the feed-dog $g$ by the motion of the shaft $m$ and its connections, as above described. The feed-lever $f$ has a slot $f''$ in its outer end, through which passes the feed-dog pin or screw $g'$, as shown in Fig. 2, so as to permit a longitudinal adjustment of the lever $f$ relative to the feed-dog, for the purpose above mentioned. The lever $p$ is limited in its rocking motion by means of adjustable stops $a''$ $a''$, secured to the under side of the work-plate $a$, as shown in Fig. 2. It will thus be seen that the amount of feed is increased when, by the motion of the shaft $m$ and its connections, the fulcrum $r''$ on lever $f$ is moved away from the feed-dog $g$ corresponding to straight-stitch work, and vice versa corresponding to zigzag work. The vertical movement of the needle-bar and presser-foot is accomplished by the main driving-shaft $c$ through the usual mechanism employed in Singer or other machines, and forms no part of our present invention.

In the operation of the machine the cam-gear $h$ is, by its gear-connection with the drive-shaft $c$, rotated at much less speed than said shaft, and consequently the needle-carrying bar is reciprocated repeatedly while being moved in one direction transverse to the feed, and as the work is very slowly fed during such transverse movement of the needle-bar a series of stitches is formed on an oblique line, which continues until the cam-gear makes one-half of a revolution. The instant this half-revolution is completed, the cam-gear continuing to rotate in the same direction, the needle-bar commences to move in the other direction transverse to the feed, and, the work still being very slowly fed, another oblique line of stitches is formed, which, in connection with the previously-formed line, has the outline of the letter V. The last-mentioned half-revolution of the cam-gear being completed, the same operation just described is repeated thus forming a zigzag line of stitches, as represented at $x$, Fig. 6, which can be continued so long as the pin or roll $k^4$ of the arm $k$ is in engagement with the cam $h''$ of the gear $h$. It will be obvious that when the arm $k$ is disengaged from the cam-groove the vibratory movement of the frame $d'$ ceases, and the machine will produce a straight line of stitches, as at $Y$, Fig. 6.

What we wish to secure by Letters Patent, and claim, is—

1. The combination, with the rocking frame $d'$, needle-bar $d$, shaft $c$, and spur-gear $h$, driven by the shaft and having a polygonal cam-groove $h''$, of the swinging arm $k$, engaging the cam-groove, a link $l$, connecting the arm with the rocking frame, and a lengthwise-sliding pin $k'$, carrying the swinging arm for moving said arm laterally from engagement with the cam-groove, substantially as described.

2. The combination, with the rocking frame $d'$, needle-bar $d$, shaft $c$, and spur-gear $h$, driven by the shaft and having a polygonal cam-groove $h''$, of the swinging arm $k$, engaging the cam-groove, a link $l$, connecting the arm with the rocking frame, a lengthwise-sliding pin $k'$, carrying the arm for moving it laterally from engagement with the cam-groove, and a spring $k''$ on the pin for restoring it to its normal position and engaging the arm with the cam-groove, substantially as described.

3. The combination, with the rocking frame $d'$, needle-bar $d$, shaft $c$, and spur-gear $h$, driven by the shaft and having a polygonal cam-groove $h''$, of the swinging arm $k$, engaging the cam-groove, a link $l$, connecting the arm with the rocking frame, a lengthwise-sliding spring-pressed pin $k$, carrying the arm, and the shaft $m$, having a projection $m''$ to act on the pin and move it lengthwise, substantially as described.

4. The combination, with the rocking frame $d'$, needle-bar $d$, shaft $c$, and spur-gear $h$, driven by the shaft and having a projection $h^3$, and a cam-groove $h''$, of a swinging arm $k$, connected with the rocking frame and engaging the cam-groove, a spring-pressed pin $k'$, carrying the arm, the shaft $m$, having the projection $m''$ and notched lever M, and the spring-pressed pin $n$, having locking-pin $n''$, substantially as described.

5. The combination of the shipper-shaft $m$, the lever $p$, secured thereto and having the regulating-screws $p''$, the lever $q$, pivoted to the lever on the shipper-shaft, the adjustable bar $r$, pivoted to the lever $q$, the feed-dog $g$, and the feed-lever $f$, having a slotted connection with the feed-dog, substantially as described.

In testimony whereof we have signed our names to this specification, in the presence of two subscribing witnesses, on this 19th day of May, A. D. 1888.

THOMAS F. HART.
GEORGE S. HILL.

Witnesses:
ALBAN ANDRÉN,
THOMAS F. NOONAN.